(12) United States Patent
Ward et al.

(10) Patent No.: US 6,845,131 B1
(45) Date of Patent: Jan. 18, 2005

(54) DIFFERENTIAL SIGNALING POWER MANAGEMENT

(75) Inventors: Vivian John Ward, Burnaby (CA); John Peter Van Baarsen, Ladner (CA)

(73) Assignee: Spectrum Signal Processing Inc., Burnaby (CA)

( * ) Notice: Subject to any disclaimer, the term of this patent is extended or adjusted under 35 U.S.C. 154(b) by 714 days.

(21) Appl. No.: 09/680,528

(22) Filed: Oct. 3, 2000

(51) Int. Cl.$^7$ .......................................... H04L 27/04
(52) U.S. Cl. .................................................... 375/295
(58) Field of Search ................................ 375/295, 318, 375/330, 224, 376; 326/93; 327/333, 52, 65, 108

(56) References Cited

U.S. PATENT DOCUMENTS

| | | | |
|---|---|---|---|
| 4,737,666 A | 4/1988 | Umeda et al. | |
| 5,287,525 A | 2/1994 | Lum et al. | |
| 5,388,265 A | 2/1995 | Volk | |
| 5,561,384 A | 10/1996 | Reents et al. | |
| 5,692,203 A | * 11/1997 | Grodevant | ................... 713/323 |
| 5,880,599 A | 3/1999 | Bruno | |
| 5,898,232 A | 4/1999 | Reents et al. | |
| 5,900,762 A | 5/1999 | Ramakrishnan | |
| 5,920,204 A | 7/1999 | Bruno | |
| 5,959,472 A | 9/1999 | Nagamatsu et al. | |
| 6,380,760 B1 | * 4/2002 | Pappert | ....................... 326/56 |

OTHER PUBLICATIONS

LVDS Interface—LVDS FAQs, National Semiconductor webpage @www.national.com, 2 pages.
LVDS Owner's Manual, Chapter 1 & 2, National Semiconductor webpage@www.national.com, 18 pages.
A Baker's Dozen of High–Speed Differential Backplane Design Tips, by John Goldie and Jinhua Chen at 2000 High–Performance Design Conference.

* cited by examiner

*Primary Examiner*—Khai Tran
(74) *Attorney, Agent, or Firm*—Mark Yang

(57) ABSTRACT

For a low voltage differential signalling technology to achieve more and faster processing, minimizing power consumption is important. A method of power management is provided whereby the transmitter circuitry is powered down at appropriate times and a minimum number of active links is maintained to maintain the integrity of the state of the logic in the receiver circuitry.

18 Claims, 7 Drawing Sheets

Output drivers consuming power output drivers consuming little power

Output driver consuming power

Differential Output driver output drivers consuming little power

Output drivers

Receiver cell disable

US 6,845,131 B1

DIFFERENTIAL SIGNALING POWER MANAGEMENT

TECHNICAL FIELD

This invention relates to differential voltage signaling technology and to methods of controlling the consumption of power therein.

BACKGROUND

For applications such as 3-D graphics, digital VCRs, real-time image processing and radio signal processing, there is a need for faster signal processing with corresponding need to minimize the power consumption and dissipation.

Various differential signaling technologies are known. Low voltage differential signaling (LVDS) is the subject of technical standards: (1) ANSI/TIA/EIA-644 standard (published in 1995 by American National Standards Institute, as updated from time to time); and (2) IEEE 1596.3 standard (published in 1996 by Institute of Electrical and Electronics Engineers as updated from time to time).

Current implementations of LVDS have differential driver output voltage in the order of 250 mVolts (up to the technical standard maximum of 450 mVolts) and receiver input threshold of about 100 mVolts. Preferred embodiments of LVDS requires only half the voltage swing of Positive Emitter Coupled Logic (PECL) technology (which has differential driver output voltage in the order of 600 mVolts to 1 Volt; and receiver input threshold of about 200 to 300 mVolts), while maintaining comparable data transfer rates of at least 400 Mbps.

SUMMARY OF THE INVENTION

There is provided a system of transmitting data through a linkage using voltage differential signaling technology, the linkage having a transmitting portion and a receiving portion with each said portion having a plurality of differential signal lines therebetween, comprising: (a) means associated with the transmitting portion, for powering down the transmitting portion from a power-up state to a power-down state in response to a power control instruction to power-down; (b) means associated with the transmitting portion, for powering up the transmitting portion from the power-down state to the power-up state in response to a power control instruction to power-up; (c) means associated with the receiving portion for preserving the integrity of the state of the logic associated therewith in the face of a decrease in data received from the transmitting portion while the transmitting portion is powering down and remains in power-down state; and (d) means associated with the receiving portion and the transmitting portion for maintaining the linkage sufficiently for transferring said power-up control instruction from the transmitting portion to the receiving portion, while the transmitting portion is powering down and remains in power-down state.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENT

For the purposes of this invention, the term "low voltage differential signaling" or LVDS refers to voltage differential signaling technology that conforms at least to the aforementioned LVDS technical standards (identified in the Background of Invention) in respect of driver output characteristics and receiver input characteristics, and to functional equivalents when expressed in terms of current loop transmission. It is expected that such input and output characteristics will improve as technology improves, and so the term LVDS, for the purpose of this invention, is meant to cover updated versions of the aforementioned LVDS technical standards. For the purpose of this invention, the term "voltage differential signaling" is a more general and conceptually older class of technologies, of which LVDS is a relatively recent subset.

Figure 1:
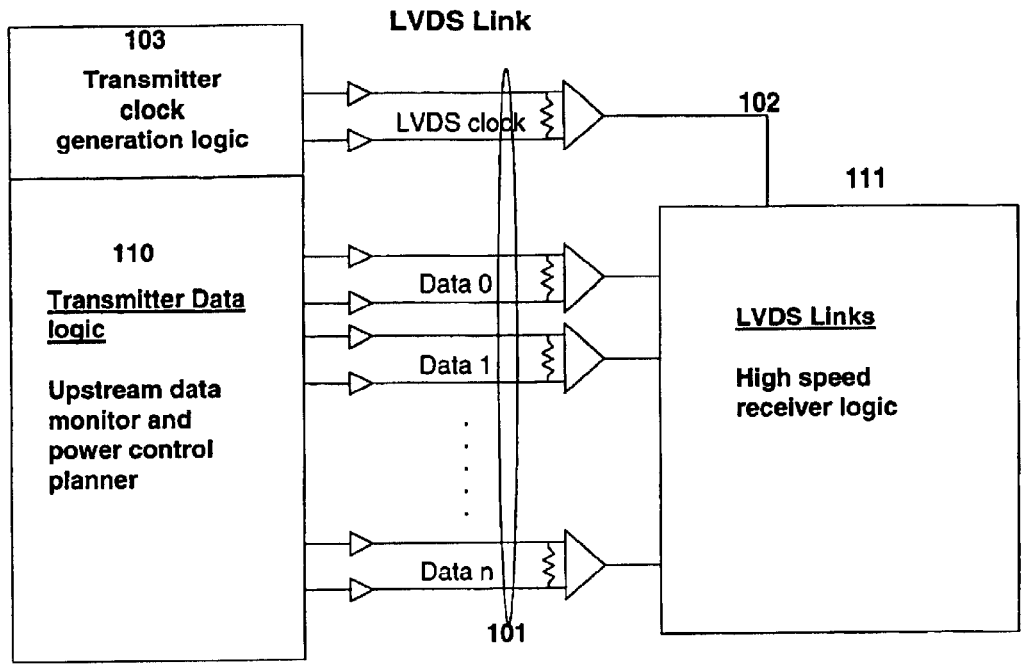
FIG. 1 shows the schematic for the preferred embodiment.

For the purposes of this invention, a "pair" is a differential signal made of two single ended output drivers (shown in FIG. 3a.) or a single differential output driver (shown in FIG. 3c) or one differential input buffer (shown in FIG. 7) or a differential output driver with a disable line (shown in FIG. 3d); a port is a unidirectional set of pairs; a Link is made of one port for transmitting signals and one port for receiving signals; and a "differential signal line" or simply "line" is used to carry the differential signal from the transmitting port pair to the receiver port pair, representing either data bits (e.g. lines 101 Data 0 to Data n in FIG. 1) or the clock or synchronization signal (LVDS clock in FIG. 1).

In current applications for LVDS technology, receiver technology often employs conventional Phase-locked loop (or PLL) technology or delayed-locked loop (DLL) technology that maintain a constant phase angle or time delay relative to a reference signal. For the purpose of this invention, the term "locked loop technology" means PLL, DLL or similar technology that maintains certain physical parameters constant relative to a provided reference.

Generally, communication is effected synchronously or asynchronously. For synchronous communication, there are typically synchronization means associated with transmitting and receiving portions and in the preferred embodiment of this invention, this can be accomplished by a dedicated clock line (as explained below with reference to the preferred embodiment). Other embodiments for synchronization are possible, including encoding the synchronization signals with data to be transmitted and decoding at the receiving portion (not shown).

Power-down/Power-up Sequence Overview

The essence of managing power is to shut power in appropriate circumstances. For the purposes of this invention, the transmitter (110 in FIG. 1) is rendered intelligent relative to upstream data flow and logic, in respect of when to power-down. In addition to transmit data logic (e.g. for a parallel to serial conversion), it has means to be responsive to instructions from upstream logic to power-down (not shown) or is adapted to monitor the status of upstream data flow and to determine when it is appropriate to power-down (e.g. the upstream data flows through a FIFO buffer so that when intelligent transmitter 110 monitors the buffer to be empty, it realizes that powering down the link to receiver 111 is appropriate). Whether intelligent transmitter 110 is instructed or by itself is adapted to decide when to power down, the implementation thereof is conventional and within normal design capabilities for any given application, and in either case, for purposes of this invention, the term "intelligent transmitter" is an intelligent transmitter as described above.

Figure 2:
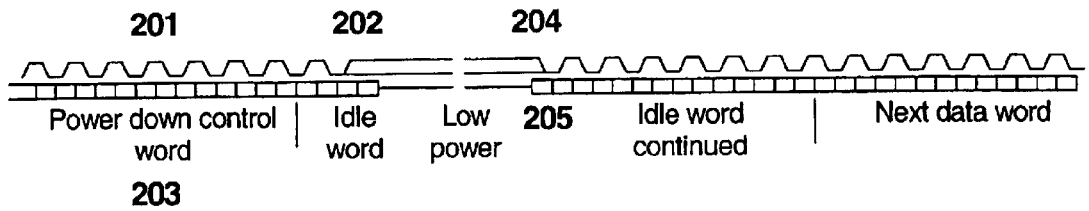
FIG. 2 shows a waveform representation of the full power cycle of the preferred embodiment (for which FIGS. 5,6,8 and 9 show particular aspects)

With reference to FIGS. 1 and 2, a schematic and power/data sequence overview of the preferred embodiment, each port has a plurality of LVDS data lines 101 and reference clock 103. Reference clock 103 is phase shifted 180 degrees relative to data (as seen in waveform 201 relative to data, in FIG. 2) but other shifts are possible. Data is clocked by clock 103 out of intelligent transmitter 110 on both the rising and falling of the signal. The receiving portion 111 has no clock recovering process.

Power-down and power-up of the current loop differential signals are described in the following sequence, with reference to FIG. 2. Idle or filler words 202 sent by intelligent transmitter 110 are understood by receiver 111 to be invalid data. Nevertheless, receiver 111 still processes words 202 to determine if power control information is encoded in them (as explained below). Intelligent transmitter 110 determines that no more data is to be sent down Link 101 and then sends a power-down word 203 to receiver 111 indicating that a power-down sequence is about to start.

Figure 3A:
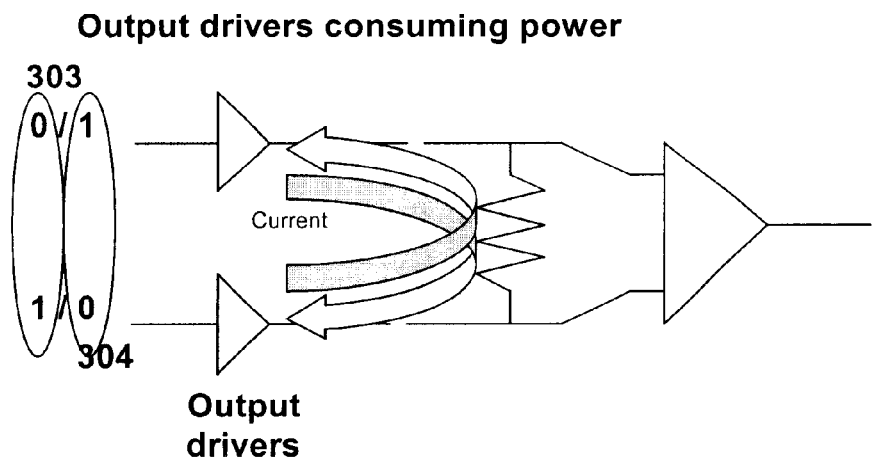
FIG. 3a, FIG. 3b, FIG 3c and FIG. 3d show the operation of LVDS output drivers and consumption of power.
Figure 3B:
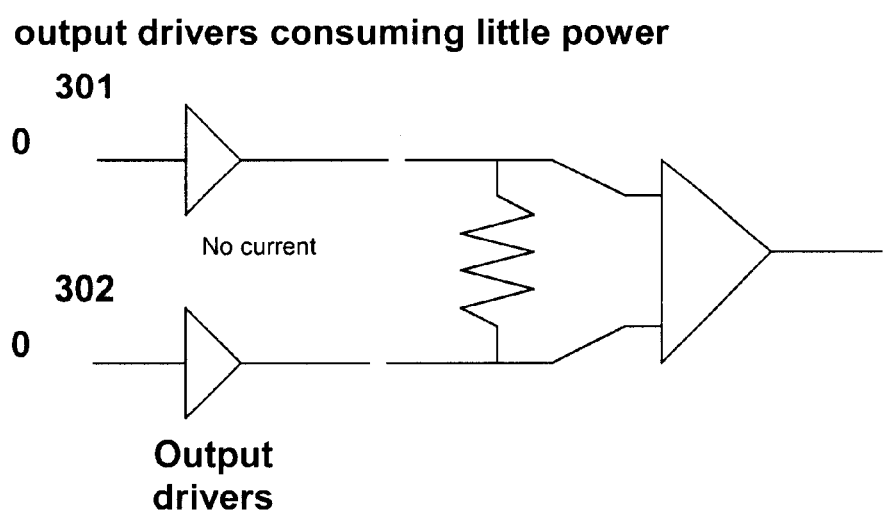
Figure 3C:
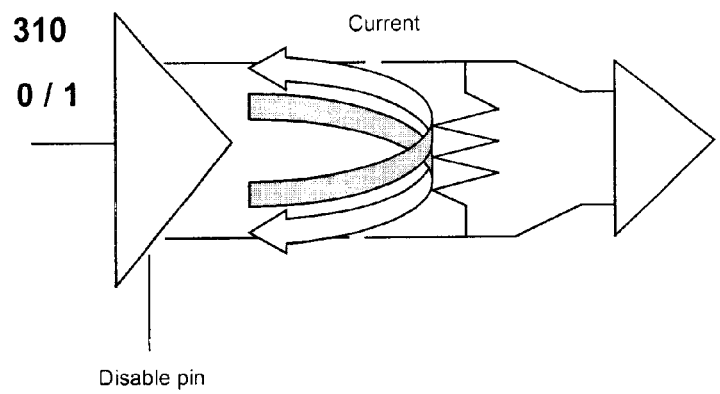
Figure 3D:
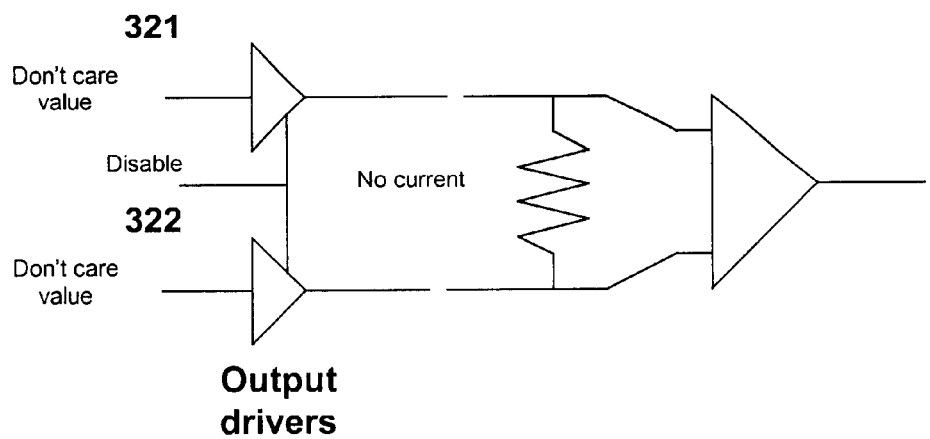

With reference to FIG. 3a, showing link power control, current flows when the two inputs are complementary (driver input states 304 and 303 flipping repeatedly). As shown in FIG. 3b, as part of power-down sequence, intelligent sitter 110 drives each differential drivers 301 and 302 on each of the four data lines to the same level of zero—this shuts off the current flow on all drivers. Alternatively, where the differential output driver is of the type that has a disable line or pin (as shown in FIG. 3d), intelligent transmitter 110 simply raises it to disable the driver internally. Also, as part of power-down sequence, transmitter clock 103 stops toggling and so is driven to a static level (i.e. input state 303 or 304 being static). At the end of power-down sequence, most of the current in intelligent transmitter 110 logic is shut off.

Receiver 111, upon receipt of the power-down control word 203 will proceed to ignore the next word from intelligent transmitter 110. Receiver 111 is clocked from intelligent transmitter 110 and associated transmitter clock 103, so when clock 103 stops toggling, receiver 111 effectively shuts down as well. As part of power-up sequence, intelligent transmitter 110 resumes toggling of clock 103 (waveform 204 in FIG. 2) and re-enables the data line drivers (waveform 205 in FIG. 2). The sequence is not important since receiver 111 is programmed to ignore the first word from intelligent transmitter 110 after a power-down control word.

Power-down Control Word

Figure 5:
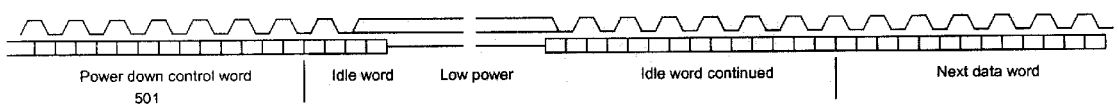
FIG. 5 shows the power-down control word within a power cycle.

With reference to FIG. 5, intelligent transmitter 110 determines when the link is to go into a power-down mode. While intelligent transmitter 110 is active (not powered down) it will continuously transmit information to receiver 111. If intelligent transmitter 110 has no valid data to send it will send idle/filler words 501 (word that receiver 111 understands as invalid data). One of the filler words 501 will actually be a power-down control word 501. This power-down control word informs the logic of receiver 111 that intelligent transmitter 110 will be powering down during the next word transmitted sent. This allows receiver 111 time to prepare for the power-down sequence.

Transmit Link Power Control

Figure 6:
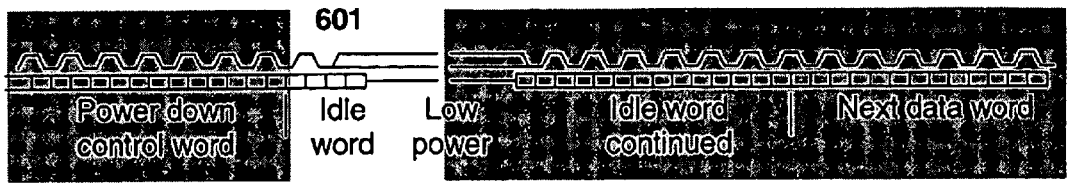
FIG. 6 shows the idle (filler) word that the receiver ignores within a power cycle.

With reference to FIG. 6, after transmission of the power down word 501 of FIG. 5, intelligent transmitter 110 proceeds to power down by reducing the current of the LVDS drivers. With reference to FIG. 3b, the preferred embodiment does this by driving each half of the differential lines (301, 302) to the same logic level—this stops the current flow through the driver because there is no longer a potential difference.

Figure 4:
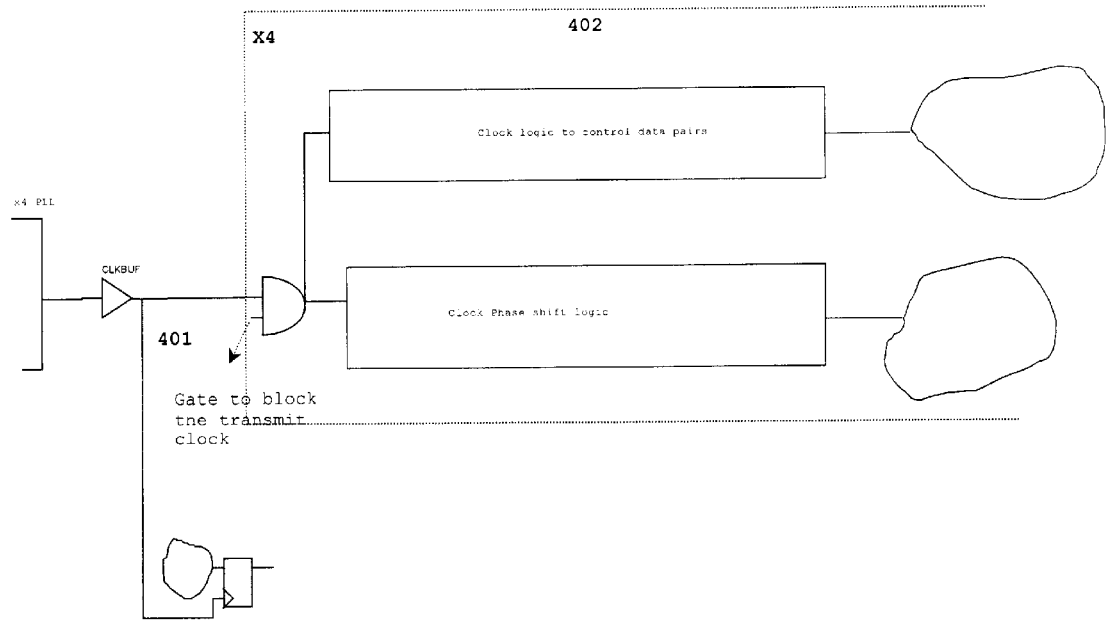
FIG. 4 shows the transmitter clock gating control of the preferred embodiment.

Additionally, with reference to FIG. 4, power is saved in intelligent transmitter 110 by disabling most of the clock transitions within the transmitter logic. Clock enable signal 401 blocks the transmitter clock from affecting transmitter logic 402.

Signal Receiver to go into Power-down Mode

With reference to FIG. 2 before going into power-down mode, intelligent transmitter 110 will send a power-down control word 203 to receiver 111. Upon receipt, receiver 111 will know that during the next word transmitted, intelligent transmitter 110 will power-down, and thereby receiver 111 will essentially go static.

Stop Transmitter Clock and Turn Off Current On Data Lines

Intelligent transmitter 110 will turn off the output drive on the data lines (301 and 302 in FIG. 3b) and stop toggling the reference clock (601 in FIG. 6). This causes receiver 111 to go silent as well. Receiver 111 has already shut off the appropriate input drivers and logic after it received the power-down word.

Figure 7:
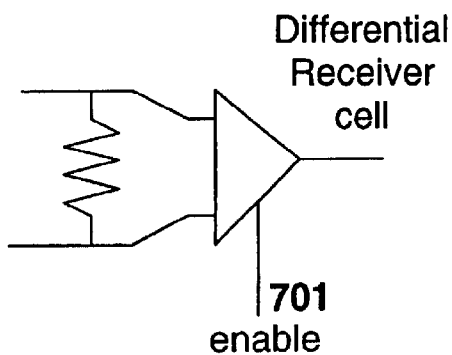
FIG. 7 shows the differential receiver with an enable pin.

With reference to FIG. 7 the LVDS input receivers have an enable pin 701 to disable the current flowing during power-down mode.

Restart Transmitter Clock and Auto Start On Receiver

Figure 8:
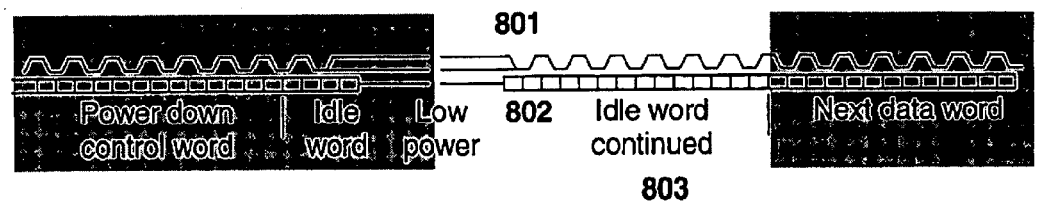
FIG. 8 shows the second part of the idle (filler) word after the power-down phase.

Intelligent transmitter 110 determines that more data needs to be sent to receiver 111. It enables output drivers (e.g. 303, 304 of FIG. 3a) and resumes toggling of the reference clock 103 (waveform 801 in FIG. 8). The sending of the filler/idle word (waveform 803 in FIG. 8) is completed (the word receiver 111 knows to ignore) and valid data 901 is sent down the link.

Receiver 111 sees clock 103 resumes toggling and immediately resumes operation. It ignores the current word (which is the filler word) and then starts receiving data which it considers valid data to be processed.

Figure 9:
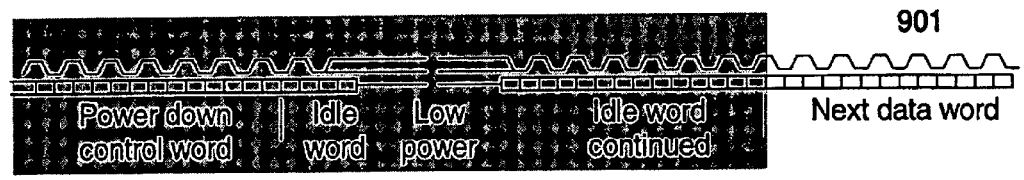
FIG. 9 shows the resumption of normal data transfers within a power cycle.

With reference to FIG. 9, intelligent transmitter 110 starts sending valid data 901 to receiver 111. The port is fully powered and transferring data.

Other Possible Implementations

If receiver 111 logic requires the use of either PLL or DLL circuits, then intelligent transmitter 110 must keep active any signals that the PLL or DLL circuits depend upon; otherwise, those circuits will lose lock and subsequent power up times may be unacceptably long. This requires a different power cycling sequence than described previously. Intelligent transmitter 110 would only power-down lines that are not required to support any PLL or DLL receiver circuits (e.g., in FIG. 10, lines 1001 and 1002). Line 1003, used to indicate the power cycle status, would obviously also remain powered.

Transmitter Power State Signalled within Data Stream (in Band)

Figure 10:
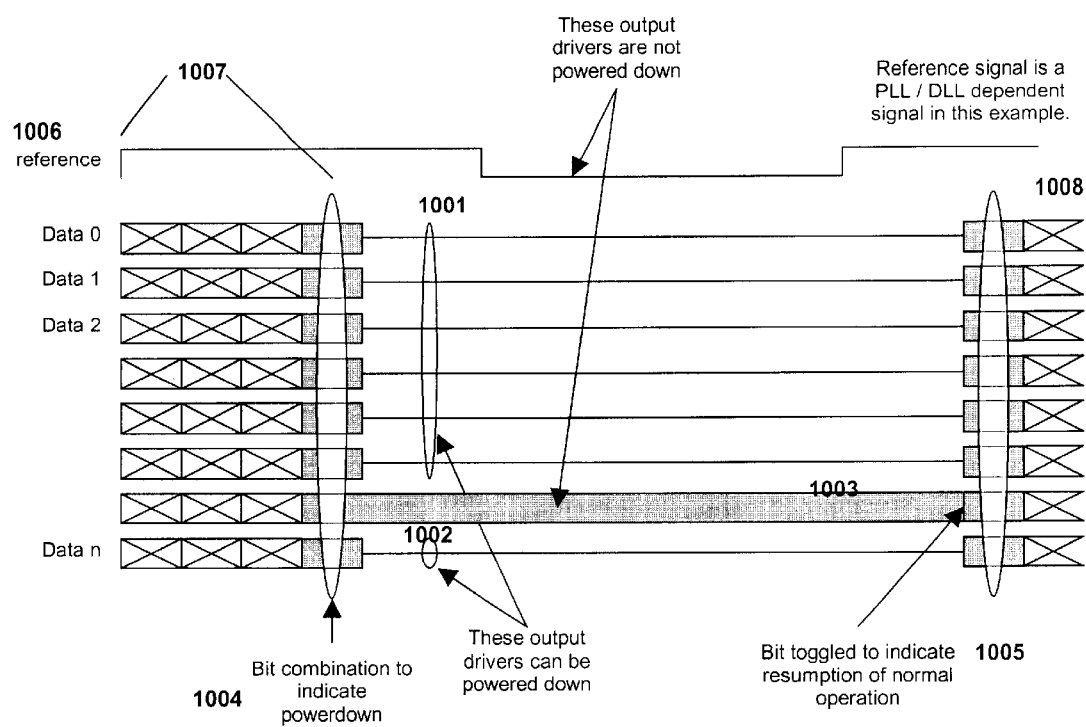
FIG. 10 shows a possible signaling method where the receiver logic has PLL or DLL dependencies.

With reference to FIG. 10, optionally, the power-down instruction can be a designated transmitted combination of bits 1004 that is interpreted by receiver 111 to be the power-down instruction. When receiver 111 detects the power-down instruction, it knows to ignore all data until the power-down state is exited 1005.

Intelligent transmitter 110 will keep active receiver PLL or DLL logic with all appropriate signals. FIG. 10 shows use of a reference line used to recover the transmit clock. Intelligent transmitter 110 will also keep active at least one additional line 1003 to communicate power status to receiver 111 (i.e. one line used to communicate power-up and power-down).

With reference to FIG. 10, line 1006 is used by receiver 111 to recover clock 103 signals associated with intelligent transmitter 110 and is also used by intelligent transmitter 110 to frame a block of data. At some fixed offset from the reference, a control field 1007 exists that can be used to communicate power control information to receiver 111. A given bit combination 1004 of control field 1007 is decoded by receiver 111 to indicate that intelligent transmitter 110 is going into a power-down mode. When in power-down mode, all but reference signal 1006 and one additional signal line 1003 is turned off (i.e. lines 1001 and 1002). The non reference signal line 1003 that remains will be used by intelligent transmitter 110 to indicate to receiver 111 the occurrence of the end of the power-down mode (by changing state of signal line 1003, as at 1005). Intelligent transmitter 110 powers up and resumes normal operation. Receiver 111 continues receiving data from intelligent transmitter at 1008.

Thus it is seen that for a low voltage differential signalling technology to achieve more and faster processing while minimizing power consumption, it is important to manage power by shutting down unnecessary circuitry. According to the preferred embodiment, power management is provided whereby the transmitter circuitry is powered down at appropriate times and the minimum number of lines to maintain the integrity of the state of the logic in the receiver circuitry is kept active. In particular, there is shown a method of managing power in a system of transmitting data through a linkage using voltage differential signaling technology, the linkage having a transmitting portion and a receiving portion with each said portion having a plurality of differential signal lines therebetween, comprising the steps of: (a) powering down the transmitting portion from a power-up state to a power-down state in response to a power control instruction to power down; (b) powering up the transmitting portion from the power-down state to the power-up state in response to a power control instruction to power up; (c) preserving the integrity of the state of the logic associated therewith in the face of a decrease in data received from the transmitting portion while the transmitting portion is powering down and remains in power-down state; and (d) maintaining the linkage sufficiently for transferring said power-up control instruction from the transmitting portion to the receiving portion, while the transmitting portion is powering down and remains in power-down state.

Where receiver 111 has locked loop technology, a minimum of two lines must be kept active during the power-down mode (one line to maintain the integrity of the state of the logic of the locked loop technology and one line to indicate the power status of transmitter 110. Where receiver 111 does not depend on synchronicity with transmitter 110, then only one line (to indicate the power state of transmitter 110) is necessary to keep active. In other words, where receiver 111 does not employ DLL or PLL technology, there is no need to maintain reference clock 1006 so that such technology can recover synchronization with transmitter 110.

Powering down receiver 111 is optional. It is sufficient that receiver 111 be adapted to maintain the state of its logic while transmitter 110 is powering down and remains powered down—it is unnecessary that receiver power down itself.

While the principles of the invention have now been made clear in the 110 illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. A system of transmitting data through a linkage using voltage differential signaling technology, the linkage having a transmitting portion and a receiving portion with each said portion having a plurality of differential signal fines therebetween, comprising:
    (a) means associated with the transmitting portion, for powering down the transmitting portion from a power-up state to a power-down state in response to a power control instruction to power down;
    (b) means associated with the transmitting portion, for powering up the transmitting portion from the power-down state to the power-up state in response to a power control instruction to power up;
    (c) means associated with the receiving portion for preserving the integrity of the state of the logic associated therewith in the face of a decrease in data received from the transmitting portion while the transmitting portion is powering down and remains in power-down state; and
    (d) means associated with the receiving portion and the transmitting portion for maintaining the linkage sufficiently for transferring said power-up control instruction from the transmitting portion to the receiving portion, while the transmitting portion is powering down and remains in power-down state.

2. The system of claim 1, wherein the voltage differential signaling technology is low voltage differential signaling technology.

3. The system of claim 2, wherein said transmitting portion has means for monitoring upstream data flow, determining the appropriate power control instruction and when to generate it, and for generating said power-down control instruction or said power-up control instruction depending on the status of the upstream data flow.

4. The system of claim 1, 2 or 3, wherein the data is transmitted synchronously, further comprising:
    (e) synchronization means associated with the transmitting portion for generating a synchronization signal and transmitting said synchronization signals to the receiving portion through one of said plurality of differential signal lines.

5. The system of claim 4, further comprising decoding means associated with the receiving portion and wherein said synchronization means further comprises encoding means complementary to said decoding means, whereby said synchronization signal is encoded in data transmitted by the transmitting portion and then decoded by the receiving portion.

6. The system of claim 5, wherein the receiving portion has locked loop technology.

7. The system of claim 6, wherein said transmitting portion means for powering down, powers down only to the extent that the state of the logic of the locked loop technology of the receiving portion is not affected.

8. The system of claim 7, wherein the linkage transmitting portion has differential drivers and means for disabling current thereto.

9. The system of claim 8, wherein said current disabling means sets the output of each said driver to the same level.

10. The system of claim 9, wherein said current disabling means disables internally said drivers.

11. The system of claim 8, wherein said transmitting portion means for powering down is responsive to an additional dedicated signal for powering down.

12. The system of claim 7, wherein the presence of said synchronization signal and the maintenance of one predesignated differential signal line while all other differential signal lines are inactive, is interpreted by the receiving portion to be said power-down signal.

13. The system of claim 10, wherein said power-down control instruction comprises a signal to indicate to power down and subsequent filler words, and the receiving portion is adapted for ignoring any signals after said power-down signal and for preparing for the consequences of the transmitting portion powering down by completing any unfinished calculations associated with the receiving portion and maintaining the state of its logic immediately prior to the powering down of the transmitting portion.

14. The system of claim 13, wherein said transmitting portion means for powering up, resumes said synchronization means from power-down state.

15. The system of claim 12, wherein said one predesignated differential signal line is used to transmit said synchronization signal and the cessation of said synchronization signal is interpreted by the receiving portion as said power-down control instruction, and the resumption of said synchronization signal by the receiving portion is interpreted as said power-up control instruction.

16. The system of claim 15, further comprising:
(f) means for powering down the receiving portion from a power-up state to a power-down state in response to said power-down control instruction from the transmitting portion.

17. The system of claim 16, further comprising means for powering up the receiving portion from the power-down state to the power-up state in response to said power-up control instruction from the transmitting portion.

18. A method of managing power in a system of transmitting data through a linkage using voltage differential signaling technology, the linkage having a transmitting portion and a receiving portion with each said portion having a plurality of differential signal lines therebetween, comprising the steps of:

(a) powering down the transmitting portion from a power-up state to a power-down state in response to a power control instruction to power down;

(b) powering up the transmitting portion from the power-down state to the power-up state in response to a power control instruction to power up;

(c) preserving the integrity of the state of the logic associated therewith in the face of a decrease in data received from the transmitting portion while the transmitting portion is powering down and remains in power-down state; and (d) maintaining the linkage sufficiently for transferring said power-up control instruction from the transmitting portion to the receiving portion, while the transmitting portion is powering down and remains in power-down state.

* * * * *